Oct. 3, 1950     H. L. ROSENTHAL     2,524,603
CORN HARVESTER
Filed May 20, 1944     3 Sheets-Sheet 1
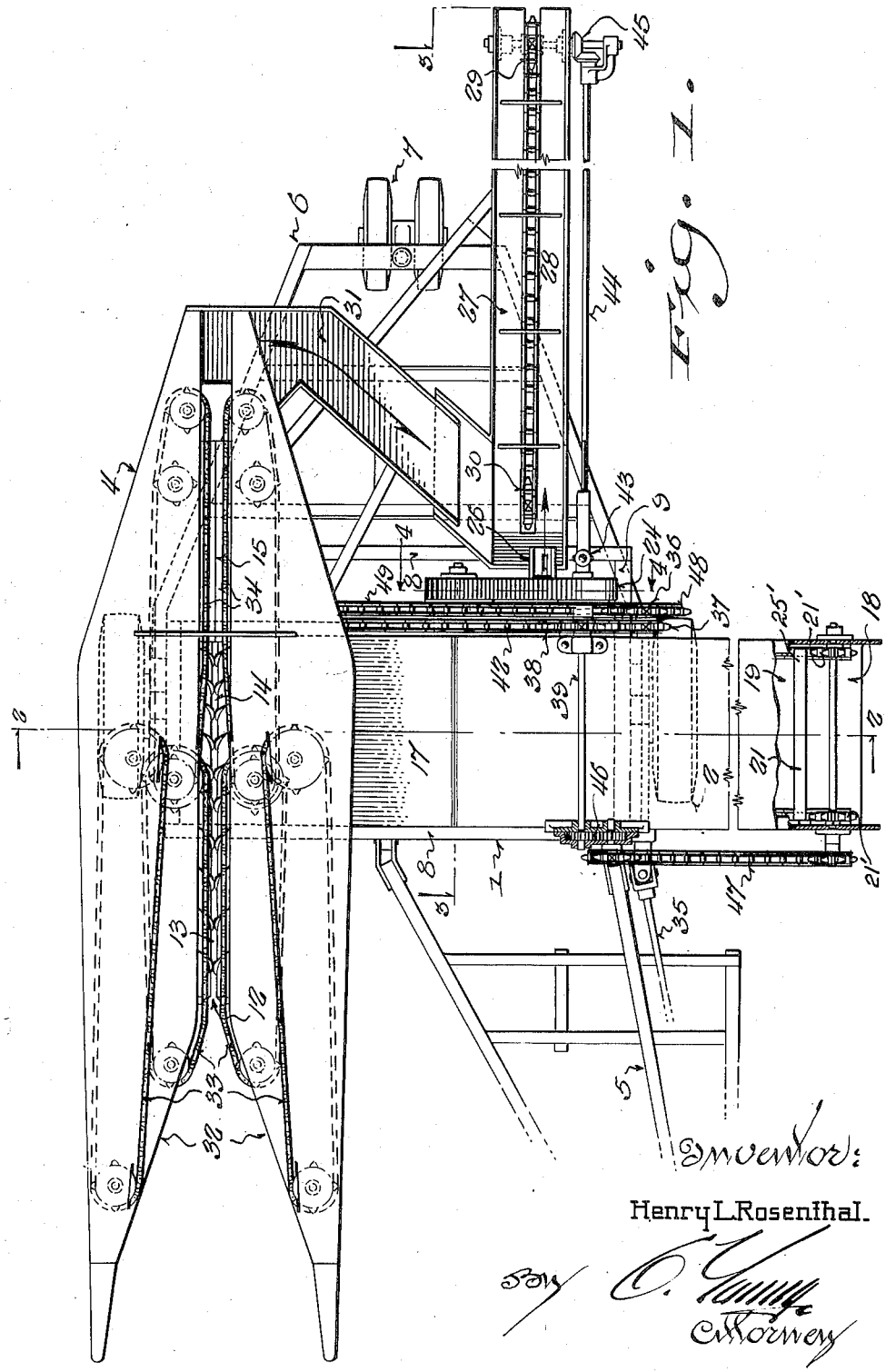

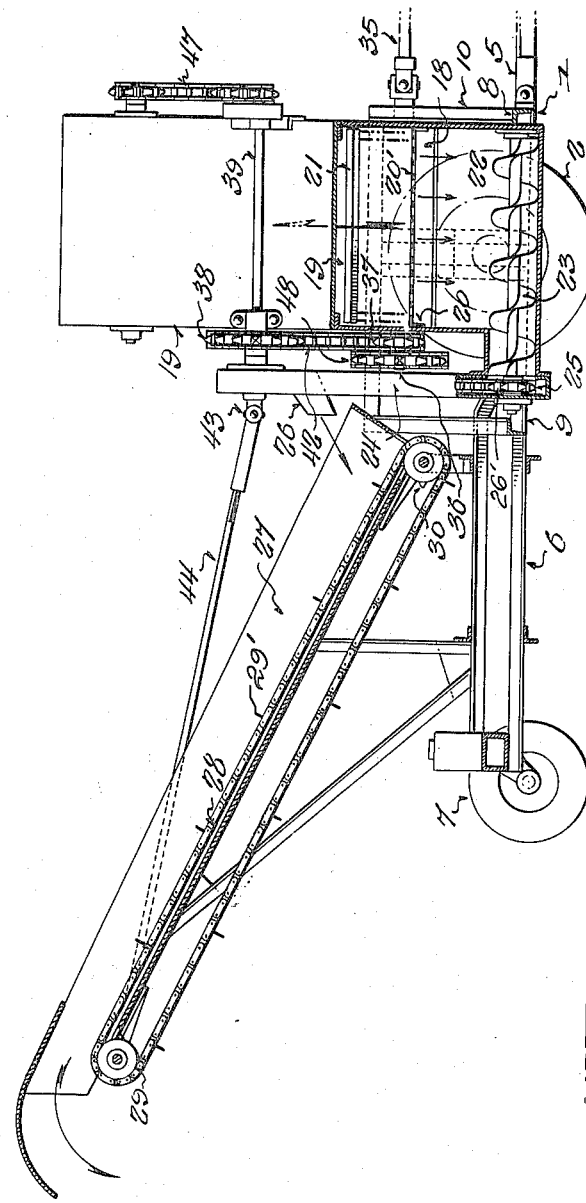

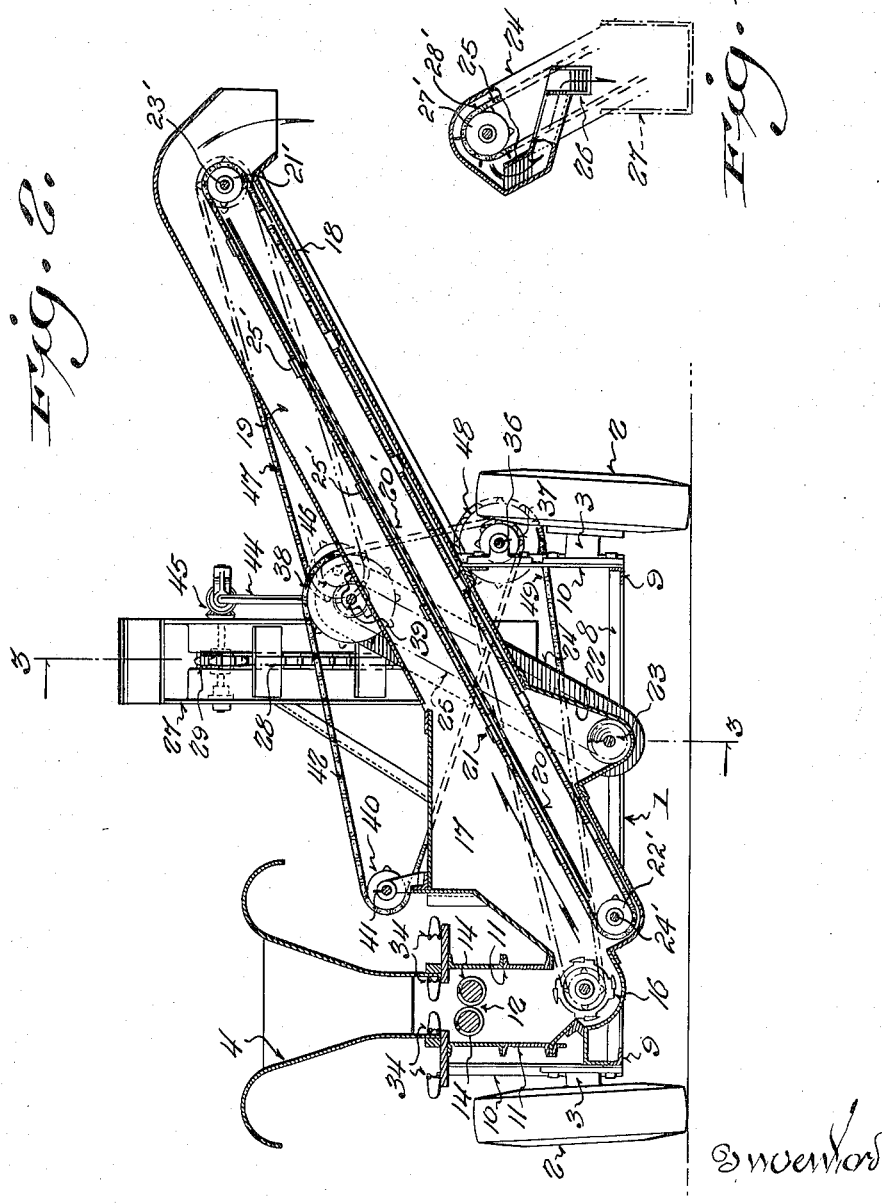

Patented Oct. 3, 1950

2,524,603

UNITED STATES PATENT OFFICE 2,524,603

CORN HARVESTER

Henry L. Rosenthal, West Allis, Wis.

Application May 20, 1944, Serial No. 536,501

8 Claims. (Cl. 56—61)

The present invention pertains to corn harvesters for operating in the field to cut, snap, and husk the corn, and chop or shred the stalks and husks for feed, such as disclosed in the patents to Trottman #1,722,717 and Swenson #2,333,901, and applicant's co-pending application Serial No. 530,805, now Patent 2,501,097.

In the present application, the gathering, cutting, snapping and husking mechanism shown is conventional, and therefore the invention relates more particularly to the novel manner in which the component parts of the harvested crops are handled and delivered to trailers or other conveyances for transportation from the field.

Heretofore, it has been common practice to use reciprocative shakers for separating the shelled corn from the chopped or shredded feed, and deliver the feed and kernels to one or more blowers for discharge into trailed wagon boxes, and while such devices serve their ultimate purpose, from the standpoint of weight, multiplicity of parts and speed of operation they are objectionable.

It is therefore the primary object of the present invention to overcome the foregoing objections by the provision of an exceedingly light, simplified, and relatively low-cost corn harvester, capable of maximum speed of operation and capacity.

Incidental to the foregoing, a more specific object resides in the elimination of shakers and blowers by the provision of a conveyor traveling over a perforated table or screen for receiving material from the chopper, and separating and delivering shelled corn and feed to suitable receivers.

Another object of the invention resides in the relative arrangement and direction of discharge of the delivery conveyors, whereby a more even distribution of weight is obtained, and a more convenient arrangement of receiving conveyances is permissible.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings are illustrated one complete example of the physical embodiment of the present invention constructed according to the best mode so far devised for the practical application of the principles thereof.

In the drawings:

Fig. 1 is a plan view of a corn harvester incorporating features and principles of the present invention, parts being broken away to show internal mechanism;

Fig. 2 is a transverse sectional view taken on the line 2—2 of Fig. 1;

Fig. 3 is a longitudinal section taken on the lines 3—3 of Figs. 2 and 1; and

Fig. 4 is a fragmentary detail of the shelled corn conveyor taken approximately along the line 4—4 of Fig. 1, parts being broken away and in section.

With particular reference to the drawings, in which one practical form of the invention is illustrated, the machine consists essentially in a main frame designated by the numeral 1 and supported upon wheels 2 carried by stub axles 3, which are secured to the sides of the main frame. Rigidly mounted upon the main frame adjacent one side is a gathering, snapping, husking and shredding mechanism 4, while a drawbar 5 is pivotally connected to the front of the frame adjacent its opposite side for attachment to a tractor or draft implement (not shown).

Pivotally connected to the rear end of the main frame 1 is a trailer frame 6, supported at its rear ends upon a castor wheel assembly 7.

The foregoing combination is fully shown and described in my co-pending application Serial No. 530,805.

The main harvester frame 1 consists of a fabricated structure including spaced transverse angle irons 8 connected by cross-members 9 to which suitable uprights 10 are attached to carry the stub axles 3 of the supporting wheels.

The gathering, snapping, husking and shredding unit 4 consists of spaced longitudinal channels 11, inclined downwardly and forwardly beyond the front end of the main frame 1. Mounted between the channels 11 is a pair of combination rolls 12, comprising lower feed sections 13, intermediate snapping sections 14 and upper husking sections 15.

Disposed below the snapping portion 14 and the channels 11, in longitudinal relation to the rolls 12 is a rotary shredder head 16, which chops the stalks received from the snapping portion of the rolls 12 and delivers the same transversely as indicated by the arrow in Fig. 2 of the drawings.

Mounted on the frame 1 in transverse relation to the shredder head 16, is a housing 17 provided with an inclined bottom 18 extending beyond one side of the main frame to form a trough 19. Spaced above the bottom 18 of the housing and having its side edges suitably connected to the sides of the housing is a table 20 over which an endless chain conveyor 21 travels in a direction to convey material from the shredder 16 and deliver the same from the upper end of the trough 19 to a suitable receptacle either driven or drawn alongside of the machine. The conveyor travels around sets of sprockets 21' and 22' mounted on shafts 23' and 24' respectively. The latter are suitably journalled transversely of the housing. The conveyor includes transverse material moving flights 25' which ride over the table 20 to push material therealong (see Figs. 1 and 2).

As best shown in Fig. 2, the intermediate portion 20' of the inclined table 20 is perforated to allow shelled corn delivered with chopped feed to the conveyor 21 to be separated from the feed and dropped upon the inclined bottom 18 of the trough 19. Adjacent its lower end, the bottom 18 is provided with a receiving trough 22 into which the shelled corn passing through the perforated portion 20' of the table 20 is delivered and discharged rearwardly by a screw conveyor 23. The conveyor 23 extends transversely in the trough 22 and is rotated in a direction to convey shelled corn rearwardly along the bottom of said trough.

From the conveyor 23 the shelled corn is delivered into a vertical housing 24 provided with a conveyor 25, which carries the kernels upwardly and discharges the same through a spout 26 into an inclined trough 27 mounted on the trailer frame 6 and extending rearwardly to deliver material to a drawn wagon box or trailer. The conveyor 25 is of an endless chain type and travels around sprocket wheels 26' and 27'. The sprocket 26' is mounted on the same shaft as the screw conveyor 23 to drive the latter (see Fig. 3), and the sprocket 27' is driven by a shaft 44. The endless conveyor 25 is provided with material moving flights 28' (see Fig. 4). Within the trough 27 is an endless chain type conveyor 28 having transverse flights 29' for moving material along the bottom of the trough 27. The conveyor travels around upper sprockets 29 and lower sprockets 30.

As best shown in Fig. 1, disposed beneath the upper or husking ends of the rolls 12 is a chute 31 for receiving husked ears from the rolls and delivering the same to the trough 27, which also receives the shelled kernels.

In operation, as the machine is drawn over a row of corn by a tractor, the stalks are guided to the rolls 12 by gathering frames 32. After the stalks are gripped by the feed portions 13 of the rolls and the gathering chains 33, they are carried rearwardly and upwardly to the snapping portions 14 of the rolls from which the stalks are fed downwardly to the shredder 16, while the snapped ears are carried upwardly by the chains 34 over the husking portions 15 of the rolls. The husks thus removed are also delivered to the shredder 16 as shown in my co-pending application, while the husked ears are delivered to the chute 31 which discharges them into the delivery trough 27.

The stalks, together with the husks delivered to the shredder, are chopped and discharged into the housing 17 together with any shelled corn passing through the rolls, after which the conveyor carries the material upwardly over the perforated table 20 to separate the shelled kernels from the cut feed in the manner described, the shelled kernels being delivered from the lower end of the trough 19 by the screw conveyor 23 to the conveyor housing 24, from which they are discharged into the delivery trough 27 together with the husked ears, while the chopped feed is discharged at the upper end of the trough 19 laterally of the machine.

To drive the operative parts of the machine, power may be taken off the tractor through a shaft 35 universally connected with a drive shaft 36 carried by the uprights 10 at one side of the main frame 1. A sprocket 37 mounted on the shaft 36 drives a sprocket 38 mounted on a shaft 39 journalled on the top of the housing 17, and also a sprocket 40 secured on a shaft 41, through a chain 42.

The shaft 39 serves to drive the shelled corn elevating conveyor 25, which in turn operates the screw conveyor 23, while the shaft 41 drives the rolls 12, the gathering and conveyor chains 33 and 34 respectively, and the cutting mechanism (not shown) that severs the standing stalks. This mechanism is shown and described in considerable detail in my co-pending application Serial No. 530,805, therefore repetition is considered unnecessary here.

Drive for the delivery conveyor 27 is taken off of the shaft 39 through a universal spline coupling 43 and a shaft 44 operating through beveled gears 45 to drive the upper conveyor sprocket 29.

The conveyor 21 is also driven from the shaft 39 through a set of pinions 46, which reverses the direction of drive, and a chain and sprocket drive 47 connected with the upper end of the conveyor 21.

The cutter head 16 is driven by a chain 49 from a sprocket 48 secured on the drive shaft 36.

From the foregoing explanation considered in connection with the accompanying drawing, it will be seen that a corn harvester has been devised in which a materially simplified, compact and light mechanism has been provided for handling and delivering component parts of the harvested crop to receiving receptacles, either drawn or propelled adjacent the machine.

It will also be appreciated that in addition to simplifying and reducing the weight of the separating and conveying mechanisms, the arrangement of the conveyors affords a highly desirable distribution of weight on the machine to counterbalance the weight of the gathering, snapping and husking mechanism, thus overcoming one of the great objections to machines of the present type, in which difficulty is encountered because of the offset required between the harvesting mechanism and tractor pull.

I claim:

1. In a corn harvester having a wheeled frame, a drawbar extending forwardly of said frame from a point at one side thereof, gathering mechanism on the opposite side of said frame extending longitudinally thereof, a conveyor for husked ears extending rearwardly from said frame from a point in the width intermediate the gathering mechanism and drawbar, snapping and husking mechanism adjacent said gathering mechanism, a shredder beneath said snapping and husking mechanism, means for delivering husked ears laterally from said snapping and husking mechanism to said conveyor, and a second conveyor of the endless type projecting laterally from the side of the frame opposite to the side on which said gathering mechanism is located, the inner end of said second conveyor being located adjacent said shredder.

2. In a corn harvester having a wheeled frame, a drawbar extending forwardly of said frame from a point at one side thereof, gathering mechanism on the opposite side of said frame extending longitudinally thereof, a conveyor for husked ears extending rearwardly from said frame, snapping and husking mechanism adjacent said gathering mechanism, a shredder beneath said snapping and husking mechanism, means for delivering husked ears from said snapping and husking mechanism to said conveyor, and a second conveyor of the endless type projecting laterally from the side of the frame opposite to the side on which said gathering mechanism is located, the inner end of said second conveyor being located adjacent said shredder.

3. In a corn harvester having a wheeled frame, a drawbar extending forwardly of said frame from a point at one side thereof, gathering mechanism on the opposite side of said frame extending longitudinally thereof, a conveyor for husked ears extending rearwardly from said frame from a point in the width intermediate the gathering mechanism and drawbar, snapping and husking mechanism adjacent said gathering mechanism, a shredder beneath said snapping and husking mechanism, means for delivering husked ears laterally from said snapping and husking mechanism to said conveyor, and a second conveyor projecting laterally from the side of the frame opposite to the side on which said gathering mechanism is located, the inner end of said second conveyor being located to receive feed from said shredder, said second conveyor being of an endless type, a table over which said conveyor operates, said table having a perforated portion to allow shelled corn to pass therethrough, and a trough below said conveyor located to receive said shelled corn.

4. In a corn harvester having a wheeled frame, a drawbar extending forwardly of said frame from a point at one side thereof, gathering mechanism on the opposite side of said frame extending longitudinally thereof, a conveyor for husked ears extending rearwardly from said frame from a point in the width intermediate the gathering mechanism and drawbar, snapping and husking mechanism adjacent said gathering mechanism, a shredder beneath said snapping and husking mechanism, means for delivering husked ears laterally from said snapping and husking mechanism to said conveyor, and a second conveyor projecting laterally from the side of the frame opposite to the side on which said gathering mechanism is located, the inner end of said second conveyor being located to receive feed from said shredder, said second conveyor being of an endless type, a table over which said conveyor operates, said table having a perforated portion to allow shelled corn to pass therethrough, a trough below said conveyor located to receive said shelled corn, and a spiral conveyor extending longitudinally of the frame for conveying shelled corn from said trough.

5. In a corn harvester having mechanism for gathering, snapping, and husking corn, and having a shredder, a conveyor housing having its inner end positioned to receive feed from the shredder, the bottom of said housing having a trough, a table in said housing spaced above the bottom thereof, and an endless conveyor movable over said table, said table having perforations through which shelled corn may fall, and said trough being located in a position to intercept said shelled corn.

6. In a corn harvester having mechanism for gathering, snapping and husking corn, and having a shredder, a conveyor housing having its inner end positioned to receive feed from the shredder, a table in said housing spaced above the bottom thereof, an endless conveyor movable over said table, said table having perforations through which shelled corn may fall, and means at the bottom of said housing below said table for intercepting said shelled corn.

7. In a corn harvester having mechanism for gathering, snapping, and husking corn, and having a shredder, a conveyor housing having its inner end positioned to receive feed from the shredder, the bottom of said housing having a trough, a table in said housing spaced above the bottom thereof, and an endless conveyor movable over said table, said table having a solid portion adjacent the receiving end of the conveyor housing and having an intermediate portion formed with perforations through which shelled corn may fall, said trough being located to intercept said shelled corn.

8. In a corn harvester having mechanism for gathering, snapping, and husking corn, a shredder, an upwardly inclined conveyor housing having its lower end positioned to receive feed from the shredder, a table in said housing spaced above the bottom thereof, and extending longitudinally of the housing at substantially the same incline, an endless conveyor movable over said table, the lower portion of said table being solid and said table having perforations above said solid portion through which shelled corn may fall, and a transverse trough at the bottom of said conveyor housing, the major portion of the perforated area of the table being located upwardly of the conveyor housing with respect to said trough.

HENRY L. ROSENTHAL.

REFERENCES CITED

The following references are of record in the file of this patent:

UNITED STATES PATENTS

| Number | Name | Date |
|---|---|---|
| 879,404 | McInture et al. | Feb. 18, 1908 |
| 1,034,152 | Skinner | July 30, 1912 |
| 1,528,635 | Ronning et al. | Mar. 3, 1925 |
| 1,644,537 | Meacham | Oct. 4, 1927 |
| 2,333,901 | Swenson | Nov. 9, 1943 |